United States Patent [19]

Lasher

[11] 4,181,638

[45] Jan. 1, 1980

[54] HIGH SOLIDS POLYESTER RESIN-BASED COATING COMPOSITION AND METHOD OF MAKING SAME

[76] Inventor: Edward A. Lasher, 1141 Shadow Hill Way, Beverly Hills, Calif. 90210

[21] Appl. No.: 903,571

[22] Filed: May 8, 1978

[51] Int. Cl.$^2$ .................. C09D 3/52; C09D 3/64; C09D 3/66

[52] U.S. Cl. ................... 260/22 R; 260/21; 260/22 M; 260/22 CQ; 525/174

[58] Field of Search .............. 260/21, 22 CQ, 22 M, 260/22 R, 850

[56] References Cited

U.S. PATENT DOCUMENTS

| | | | |
|---|---|---|---|
| 3,480,693 | 11/1969 | Hill et al. | 260/850 |
| 3,691,258 | 9/1972 | Riemhofer et al. | 260/850 |
| 3,714,090 | 1/1973 | Lasher | 260/21 |
| 3,714,091 | 1/1973 | Lasher | 260/21 |
| 3,957,709 | 5/1976 | Holzrichter et al. | 260/850 |
| 3,996,182 | 12/1976 | Hong et al. | 260/18 EP |
| 4,049,599 | 9/1977 | Lott | 260/22 M |
| 4,071,578 | 1/1978 | Lasher | 260/850 |

*Primary Examiner*—Ronald W. Griffin
*Attorney, Agent, or Firm*—Jay H. Quartz

[57] ABSTRACT

A low molecular weight polyester resin is made by condensation reaction of particular polyols and carboxylic acids in a reaction mixture having excess hydroxyls and a system functionality between about 1.6 and 1.8. In one embodiment, an aliphatic diol, a cyclic dicarboxylic acid and a monobasic fatty acid are condensation reacted together to produce the polyester resin, whereas in a second, and preferred, embodiment, the monobasic fatty acid is present as a hydroxyl-bearing, polyol-esterified oil or fatty acid. The polyester resin of either embodiment can be cross-linked with an aminoplast resin, in the presence or absence of pigment, in a coating composition comprising 90% by weight and higher amounts of solids to produce cured coatings exhibiting good hardness, flexibility, chemical resistance and gloss. Pigment can be present in the cured coatings in amounts up to at least 60% by weight of the solids.

42 Claims, No Drawings

HIGH SOLIDS POLYESTER RESIN-BASED COATING COMPOSITION AND METHOD OF MAKING SAME

BACKGROUND OF THE INVENTION

This invention relates to heat-curable coatings compositions and, more particularly, relates to high solids coatings compositions for use on metal substrates.

In metal can and coil coating operations, large amounts of coatings formulations, e.g., 10,000 lb. and more per 24 hr. period, are commonly used. Because the coatings formulations which have been used heretofore have been primarily organic-solvent based compositions, commonly containing 40%-50% by weight solvent, significant air pollution problems have resulted from the evaporation of the organic solvents into the atmosphere during cure.

To meet today's more stringent air quality standards, various approaches have been taken to reduce the amount of organic solvent passing into the atmosphere. One approach involves utilizing burners to incinerate the evaporating organic solvents and thereby reduce them to harmless products. However, this method is quite expensive because it necessitates the addition of burners and utilizes substantial amounts of fuel to operate those burners.

A second approach involves substitution of a substantial portion of the organic solvents by water. Although this solution effectively reduces air pollution because of the reduced (but not eliminated) amounts of organic solubilizing agents, e.g., coupling agents, utilized, significant amounts of energy are nevertheless required to evaporate the water (because of its high heat of vaporization) during coatings cure and to incinerate the organic solubilizing agents to minimize air pollution potentially produced by such constituents.

Because of the aforementioned disadvantages associated with presently-utilized methods of meeting air quality standards in the can and coil coating industry, it has been proposed that "high-solids" coatings formulations be made. Theoretically, these proposed formulations would contain at least about 85% by wt. solids with the remainder comprising organic and/or water solvent. By "solids" is meant the portion of a coatings formulation which is not subject to evaporation during cure and which thus remains on a substrate after cure as a protective coating. The "solids" may or may not themselves be solid before cure. Typically, the "solids" in the described compositions include polyester resin, aminoplast resin, and (if needed) pigment, although waxes, fillers, etc., may also be solids constituents.

Heretofore, commercially-acceptable high solids liquid coatings compositions have not been produced. One reason is that it has not been possible to make high solids formulations having sufficiently low viscosities to provide satisfactory coatings flow on substrates under existing coating line operating conditions. Attempts to utilize traditional polyesters having molecular weights on the order of 2000 and higher produce formulations having viscosities which are too high to be useful at high solids levels. On the other hand, use of low molecular weight ester compounds such as those described in U.S. Pat. No. 3,957,709, issued May 18, 1976, and entitled "Water-Soluble Ester Intermediates and Water-Insoluble Coatings Made Therefrom", while reducing viscosities to desirable levels, does not produce high solids compositions because of the loss of significant amounts of the ester compounds during cure because of their volatility.

Another reason for the present lack of success in producing commercially acceptable high solids coatings compositions relates to the necessity in many applications of using pigmented coatings. Because the pigment does not contribute to adhesion, flow, etc., and in fact often adversely affects such properties at high pigment loading, the vehicle must compensate for the presence of any such large amounts of pigment. This factor has further complicated the search for a satisfactory high solids coatings composition because it more narrowly limits vehicle characteristics.

As indicated by the foregoing, there is a present need for a satisfactory high solids coatings composition.

SUMMARY OF THE INVENTION

This invention is embodied in a high solids coatings formulation which may comprise at least about 90%, and up to about 100% by weight of solids. The vehicle portion of such coatings formulation comprises a particular low molecular weight polyester resin and an aminoplast which provides cross-linking upon cure. Pigment and other solids constituents may also be incorporated in the described coatings formulation.

Several advantages follow from use of the hereindescribed compositions. First, they have viscosities and flow characteristics which permit excellent substrate coverage even at coil coating-line speeds. Furthermore, the resulting cured coatings exhibit excellent gloss, adhesion, and flexibility with good surface hardness.

Another advantage is that large amounts of pigment can be included in the described compositions. For example, pigment/vehicle weight ratios of 1:1 and higher can be advantageously utilized. Additionally, when pigment is needed, it can be quickly and easily blended into the vehicle.

Still another advantage is that the described formulations can be used as one-coat coatings over, for example, aluminum, without any primer.

A further advantage results from the energy savings realized during cure of the described compositions. A significant savings is produced because only a small amount of material is removed, i.e., volatilized, during cure. This means that an overall lesser amount of energy is required to volatilize a very small percentage of the constituents and to incinerate the volatilized material in contrast to the greater amounts of energy required to volatilize a larger percentage of the constituents in prior art compositions and to incinerate all or part of those volatiized constituents.

A still further advantage derives from the increased coating coverage possible with the herein-described formulations because of their ability to incorporate greater amounts of pigment. For example, a ninety percent (by wt.) solids composition will yield 10% by weight of volatile product, but a gallon of this paint will have twice the coverage of a gallon of sixty percent solids paint, because in the former paint, there can be over six pounds of pigment as compared with three pounds of pigment in the latter paint.

DESCRIPTION OF THE PREFERRED EMBODIMENT

This invention is embodied in a high solids coatings composition which comprises a vehicle portion, a minor amount of solvent, and (usually) a pigment portion. The vehicle, in turn, comprises a low molecular weight polyester resin and an aminoplast resin capable, upon cure, of condensation reacting with each other to produce a coatings composition.

The percentage of "solids" can vary from about 90% by weight up to about 100% by weight of the weight of the pre-cured composition, depending on temperature of application with solvent constituting the remainder of the amount required to make 100 weight percent. In the usual formulation containing both vehicle and pigment, those components make up the "solids" (together with specialty additives present in very small amounts), but in "clear" compositions, i.e., not pigmented, the vehicle and solid portion of the additives constitute the "solids".

Each of the component members of the herein-described formulations will now be described.

A. Polyester Resin Component

The polyester resin is the condensation reaction product of, as essential constituents, (i) an aliphatic diol, (ii) a cyclic dicarboxylic acid, and (iii) a monobasic fatty acid. Other constituents such as (iv) aliphatic triols and (v) aliphatic dicarboxylic acids may also be advantageously, and sometimes are preferably, used in the polyester resin formulation.

(i) The aliphatic diols include both straight chain and branched chain (e.g., neopentyl glycol) structures, as well as cyclic structures. Diols incorporating ether linkages are also useful. They normally contain about 4 to about 9 carbon atoms although minor amounts by weight of somewhat higher molecular weight diols such as dodecane diol may be used in combination with the aforementioned diols. Use of the higher molecular weight diols is limited because of their softening effect on the coatings produced therewith. Specific examples of useful diols are: neopentyl glycol (NPG); 1,6 hexane diol (1,6 HD); diethylene glycol (DEG); dipropylene glycol: 1,5 pentane diol; 2 ethyl-1,3 hexane diol; 1,4 and 1,3 butane diol; cyclohexane dimethanol; and trimethyl-1,6 hexane diol.

(ii) The cyclic dicarboxylic acids include both aromatic and alicyclic dicarboxylic acids. The latter may be either saturated or unsaturated. Useful examples include: methyl tetrahydrophthalic acid; hexahydrophthalic acid; tetrahydrophthalic acid; phthalic acid (PA); isophthalic acid; cyclohexane dicarboxylic acid; and methyl hexahydrophthalic acid. Preferably, both isophthalic and cyclohexane dicarboxylic acid are used in combination with other cyclic dicarboxylic acids because they increase the viscosity of the polyester resin to the upper limits of acceptability (and sometimes beyond) when used alone. Of course, combinations of any of the cyclic dicarboxylic acids may be used provided that acceptable viscosities are produced. The cyclic dicarboxylic acids may be used in their acid or anhydride forms.

(iii) Monobasic fatty acids used herein are those monocarboxylic acids having from about 8 to about 20 carbon atoms. They may be saturated or unsaturated. Specific examples are: pelargonic acid; linoleic acid; oleic acid; palmitic acid; stearic acid; highly refined tall oil acids (TOFA); mixtures of the fatty acids from soybean oil (SFA); lauric acid; myristic acid; 2-ethyl hexoic acid; and isononoic acids (INA).

Although satisfactory high solids coatings formulations can be produced when using polyester resins prepared from mixtures containing monobasic fatty acids, qua acids, the reaction conditions must be quite carefully monitored and controlled to ensure that the desired reactions occur without significant adverse side effects. For example, because of the chain-stopping property of monocarboxylic acids, significant amounts of diol may form fatty acid diesters with the result that smoking may occur as the diol fatty acid diesters are driven off during cure. Such removal of diol esters constitutes a loss of solids. Therefore, to prevent such losses, it is preferable to use the fatty acids in an esterified form. Additionally, when using triols in the preparation of the polyester resins, it is desirable to limit their preferential reaction with the preferred anhydride form of the cyclic dicarboxylic acids by pre-reacting them with the monobasic fatty acids. Thus, the fatty acids may be, and are preferably, present as partially esterified oils obtained by alcoholization of an oil with a triol under controlled reaction conditions, as is well known, to partially transesterify the oil. In this way, a mixture of hydroxyl-bearing mono- and di-esters is produced with those esters being based about equally on glycerine (from the oil) and on the transesterifying triol. The resulting mixture of partial esters has an hydroxyl functionality between about 1.4 and about 1.8 and, preferably, has a hydroxyl functionality of about 1.5. When hydroxyl functionality values above the foregoing range are used, the resulting polyester resin solutions have unacceptably high viscosities. On the other hand, below the above-mentioned range, the percentage of mono-esters is too high thereby resulting in too many small molecules which can be lost through vaporization during cure of the described films.

Useful oils include, but are not limited to, soybean, sunflower, safflower, olive, walnut and palm oils.

By way of example, soybean oil may be alcoholized by base-catalyzed reaction (e.g., using lithium hydroxide monohydrate) with a slight molar excess of trimethylol propane to form a mono- and di-ester mixture based approximately equally on the latter polyol and on glycerine. The resulting hydroxyl-bearing partial ester compounds are relatively free from transesterification by the diols during polymerization of the polyester resin formulation constituents because of the relatively low condensation reaction temperatures used.

The fatty acids may also be present as a mixture of partial ester compounds made by condensing a triol with a fatty acid or mixtures thereof. For example, a 100% excess (on an equivalents basis) of trimethylol ethane may be reacted with highly refined tall oil fatty acids to produce a mixture of hydroxyl-bearing mono- and di-ester compounds having an average hydroxyl functionality of about 1.5.

(iv) Aliphatic triols are preferably included in the polyester resin formulation because of their use for pre-reaction with the monobasic acid constituent as described hereinbefore. Useful presently available triols generally have 3 to about 7 carbon atoms. Such triols are: trimethylol ethane (TMP); trimethylol propane; trimethylol butane; hexane triol; pentane triol; and glycerine.

(v) The aliphatic dicarboxylic acids are unsaturated straight chain dicarboxylic acids which have about 4 to about 10 carbon atoms per molecule. Such dicarboxylic acids are primarily utilized in coatings which must exhibit superior adhesion because of the characteristics of the substrate to which they are applied. For example, coatings applied to steel fall in this category—in contrast with coatings for aluminum which require less adhesion. Examples of useful unsaturated aliphatic dicarboxylic acids are: maleic acid (MA); fumaric acid, itaconic acid; and citraconic acid.

In some applications, saturated aliphatic dicarboxylic acids may also be included in the polyester resin formulation, particularly where adhesion is not so important. Saturated aliphatic dicarboxylic acids are useful for providing improved flexibility at low temperatures, while also providing greater hardness at such temperatures. Examples of the latter acids are: 1,10 dodecanedioc acid: azelaic acid; adipic acid; succinic acid; suberic acid; and trimethyl adipic acid.

Anhydrides of both the saturated and unsaturated aliphatic dicarboxylic acids may be used.

Numerous specific examples of each of the polyester resin constituents have been identified herein as being useful in the formulation. However, as will be understood by those skilled in the art, various combinations of constituents will provide better coatings than others.

B. Amounts of Polyester Resin Components

The amount of each constituent of the polyester resin is determined as follows:

First, an amount of polyol (diol or diol and triol) is used to provide a stoichiometric excess of hydroxyl groups with respect to carboxyl groups from the carboxylic acid constituents (dicarboxylic and monocarboxylic acids). The reason for using an excess of hydroxyl (rather than carboxyl) groups is that the hydroxyl groups react much more readily than carboxyl groups with aminoplast resins with the result that a more uniform end product is produced using excess hydroxyl groups.

The amount of excess hydroxyl depends upon system, i.e., reaction mixture, functionality as discussed hereinafter. However, about a 25% to about a 40% excess of hydroxyl groups to carboxyl groups is utilized.

The specific amounts of polyol and carboxylic acid are adjusted so that the system functionality is between about 1.6 and about 1.8. Preferably, the system functionality is between about 1.67 and about 1.72.

The system functionality (fsys) is the sum, for all of the constituents, of the total effective functionality of each constituent, divided by the sum of the moles of each constituent. That is, written as a formula, $$f_{sys} = \frac{\Sigma (f_{Teff})_{a, \ldots n}}{\Sigma N_{a, \ldots n}} \quad (1)$$

where "a" through "n" represent the different hydroxyl- and carboxyl-bearing functional constituents of the polyester formulation, "N" represents the number of moles of each such constituent, and "$f_{Teff}$" designates the total effective hydroxyl or carboxyl functionality of each constituent. The latter value is calculated as follows. First, the functionality (f) of each constituent, e.g., a, is multiplied by the number of moles of that constituent ($N_a$) to determine the number of equivalents of carboxyl or hydroxyl contributed by that constituent. For the purpose of these calculations, hydroxyl-bearing polyesters are treated as an unreacted combination of their constituent acids and triols (with the lost water of condensation restored) rather than as merely hydroxyl-bearing compounds. Thus, for system functionality calculation purposes, the polyester formulation is regarded either as the combination of a fatty acid, a dicarboxylic acid and diol or, when the fatty acid is present as a partial ester, as the combination of a fatty acid, a dicarboxylic acid, a diol, and a triol (assuming restoration of water of condensation as noted).

The number of equivalents of hydroxyl and of carboxyl thus obtained are then separately added to determine the total of each. Because there is an excess of hydroxyl, the total number of equivalents of hydroxyl will be greater than the total number of equivalents of carboxyl. A factor (F) is used to account for this excess of hydroxyl. It has a value less than one and is equal to the total equivalents of carboxyl divided by the total equivalents of hydroxyl. The functionality values for each of the hydroxyl-bearing constituents are each multiplied by the excess hydroxyl factor (F) to provide effective functionality ($f_{eff}$) values for each of the constituents. For the carboxyl-contributing constituents, $f = f_{eff}$. The latter value for each constituent is then multiplied by the number of moles of that constituent to obtain the total effective functionality ($f_{Teff}$) for each constituent. The latter, in turn, are added together and divided by the total number of polyester constituent moles, as previously noted at (i), to obtain the system functionality. A specific calculation is provided in Example 2 hereof.

If the polyester resin is produced without any triol contribution, then, of course, the diol contribution is 100% of the polyol. However, on the acid side, there will be a carboxyl contribution from both the dicarboxylic acid and from the monocarboxylic acid. The molar ratio of these two acid constituents is adjusted so that the molar ratio of dicarboxylic acid to monocarboxylic acid is between about 4:1 and about 1.5:1. Above this ratio range, there will be insufficient fatty acid resulting in an unacceptably high viscosity. Below this ratio range, there will be too much fatty acid which may result in coatings with reduced weatherability.

On the other hand, if the monocarboxylic acid is utilized in the preferred modified oil or esterified fatty acid form as hereinbefore described, then both the diol and the triol (including triol from the oil) constituents contribute to the polyol fraction. In such case, the molar ratio of diol to triol varies between about 2.5:1 and about 7.5:1. The aforementioned ratio range of dicarboxylic acid to monocarboxylic acid remains the same when triol is present.

If an unsaturated aliphatic dicarboxylic acid is present in the polyester formulation, it will be present in an amount sufficient to improve adhesion to a substrate and, preferably, will be present in an amount of at least about 10% by wt. of the total weight of reactants charged, with an upper limit of about 14% by wt. of the total weight of reactants charged. If a saturated aliphatic dicarboxylic acid is used, it will be present in amounts between about 4% and about 8% by wt. of the total polyester resin formulation.

Cross-Linking Agent

A cross-linking agent is used to provide a densely cross-linked coating upon condensation reaction of the cross-linking agent with the polyester resin. Thermosetting coatings which are strongly resistant to chemical and fluid attack are thereby produced.

The cross-linking agents used herein are reactive with the functional groups of the polyester resin, particularly the residual hydroxyl groups. Useful cross-linking agents have from 2-6 reactive sites per molecule. The preferred cross-linking agents are those aminoplast resins which are the products of the reaction of formaldehyde with melamine and with urea. Although either melamine or urea resins (or mixtures thereof) may be used as the cross-linking agents, it is preferred to utilize the melamines even though they are presently more expensive because they provide greater cross-linking of the cured coating resulting in coatings which exhibit better chemical and water resistance, and better exterior durability.

Useful melamine and urea resins are the alkoxy alkyl and the alkylol melamines and ureas. Specific examples include: alkoxymethyl melamines and ureas in which the alkoxy groups have 1-4 carbon atoms such as hexa alkoxy (methoxy, ethoxy, propoxy, butoxy and mixed alkoxy) methyl melamines and dialkoxy methyl ureas; and the alkylol melamines and ureas such as hexamethylol melamine and dimethylol urea.

The amount of cross-linking agent used is that which will react with substantially all of the reactive groups of the polyester resin with minimal intra-aminoplast resin reaction. It has been found that aminoplast resin in amounts between about 15% by wt. and about 30% by wt. of the total weight of aminoplast and polyester resin provides good results. Below about 15%, sufficient film hardness is not obtained thereby leaving the resulting coatings subject to attack by chemicals, fluids, etc. Above about 30%, the characteristics of the amine begin to overshadow those of the polyester resin to the detriment of the resulting coatings. Additionally, there is an increased loss during cure thereby reducing the percent of solids in the coatings. Because of this restriction on the upper limit of the amine cross-linking agent, a substantial contribution must be made to hardness by the polyester itself.

D. Preparation of the Polyester Resin and Coatings

The polyester resin is prepared using standard esterification procedures. Preferably, the reactants are charged together to a reactor equipped with heater, agitator, inert gas supply, condenser, condenser trap and decanter. A reflux solvent such as n-heptane, xylene or toluene is introduced to the reactor with the reactants. Additionally, a catalyst for increasing the rate of reaction (and thereby permitting lower reaction temperatures to be used) is also added to the reactor. An acid catalyst such as phosphoric acid or the latter with sulfuric acid may be utilized.

After all of the reactants, etc., have been introduced to the reactor, the oxygen (air) therein is substantially replaced by an atmosphere, e.g., carbon dioxide, inert to the reactants. This is done by bubbling a gas through the reactants throughout the heating cycle. The heater is then turned on to raise the reactor contents to a temperature at which esterification of the reactants takes place at an acceptable rate, yet at which there is little or no ester interchange of the diol with the triol in the hydroxyl-bearing partial esters when used. Generally, the reaction temperature is maintained below about 150 degrees C. until the reaction is about 90% complete. Thereafter, it may be allowed to rise to a temperature between about 175 degrees C. and about 190 degrees C. until all of the product distillate has distilled over and been collected.

The reaction is continued until the solids acid number is below about 20, preferably between about 8 and about 15, and most preferably between about 11-12. Above about 20, the esterification reaction is insufficiently complete resulting in too many small reaction fragments which will be lost during coating cure.

Using the described components and component concentrations and carrying out the esterification reaction to an acid number range below about 20 produces polyester resins having Gardner-Holdt viscosities of about Z2 or less at about 90% by wt. and higher solids. At slightly lower solids levels, e.g. 88%, viscosities up to Z5 are acceptable.

Various solvents can be added to the reaction product after the latter has been allowed to cool to provide the desired solids percentage. Examples of suitable solvents are xylene, n-butanol, and mixtures thereof.

Assuming substantially complete reaction, the resulting polyester resins are believed on the basis of calculation to have average molecular weights of about 900 to about 1100 and to have an average of about, but less than, 2 residual or pendant hydroxyl groups per molecule for further reaction with the aminoplast resin.

After the polyester resin has been combined with a solvent to provide the desired viscosity, the major portion of the resulting polyester resin/solvent mixture is combined with the desired amount of pigment (e.g., titanium dioxide) and additional solvent, e.g., isopropyl alcohol. The resulting mixture is readily ground to obtain the desired dispersion of pigment in vehicle. Grinding is easily accomplished without dispersion agents, etc., as required by other pigmented polyester coatings compositions. Theoretically, as much pigment as possible is desired because of the inertness of the pigment. Again theoretically, the upper limit on the amount of pigment present is the ability of the vehicle portion to provide sufficient adhesion, resistance to tape-off at bends, etc. Typical prior art polyester resin-based coatings have incorporated pigment in amounts up to about 50% by wt. of the total weight of coatings solids. In contrast, the herein-described coatings can incorporate pigment up to at least 60% by weight of the weight of solids with improved "hiding" characteristics.

After the various coatings components noted above have been ground, the remainder of the coating components is added thereto. Such other components include the aminoplast resin, the remainder of the polyester resin, waxes, catalyst, solvent, etc. The catalyst is any catalyst which will speed up cure such as phosphoric acid, sulfuric acid, dinonyl naphthalene disulfonic acid, toluene sulfonic acid, and mixtures thereof.

The resulting mixture after being substantially homogeneously mixed is coated on a suitable substrate, e.g., aluminum, steel, wood, or bakelite, to form a film of desired thickness. The film is cured by subjecting it to elevated temperatures for a time sufficient to condensation polymerize the polyester resin with the aminoplast resin. Because of their unique characteristics, the described coatings can be cured in 45-60 seconds at about 235 degrees C. As so cured, the coatings have H-2H pencil hardness, excellent resistance to methyl ethyl ketone (MEK), and good flexibility (pass 2T bend using 0.8 mm (0.032 in.) aluminum).

This invention will be further described by the following Examples in which all percentages are by wt. unless otherwise indicated.

EXAMPLE 1

This Example illustrates the formation of a mixture of mono- and di-esters by reaction of a polyol with a monocarboxylic acid.

To a reactor equipped with an electric heating mantle, a condenser, stirrer, inert gas connection, thermometer and Dean-Stark trap (for removal of water of reaction mixture and return of reflux agent to reaction mixture), there were added the following constituents: 1699 gm. of refined tall oil fatty acids (less than 1% resin acids and less than 1% unsaponifiable material) having equivalent and molecular weights of 286; 540 gm. of trimethylol propane; 6.0 gm. of an acid catalyst consisting of 66.7% of phosphoric acid (105%) and 33.3% of sulfuric acid (96%); and 60 ml. of n-heptane.

The reactor was purged of air by flowing carbon dioxide through the reaction mixture, after which the heater was turned on. With continued stirring, the temperature of the reactor contents was raised to 186 degrees C. over a 3-hour period. The reactor temperature was held at 180-185 degrees C. until no more n-heptane distilled over. Approximately 108 gm. of water were recovered.

The product which was a clear, thin liquid, had a solids acid number of 2.59.

EXAMPLE 2

This Example illustrates the preparation of a polyester resin embodying the invention described herein utilizing the ester made as described in Example 1.

To a reactor equipped as set forth in Example 1, the following constituents were charged: 648 gm. of the TMP-TOFA ester (system f=1.80) made as described in Example 1; 442 gm. of tetrahydrophthalic anhydride (THPA); 246 gm. of maleic anhydride; 682 gm. of neopentyl glycol; 6 gm. of the acid catalyst identified in Example 1; and 80 ml. of n-heptane.

The air was purged from the reactor using carbon dioxide gas after which the heater was turned on. Stirring was provided by the carbon dioxide until the reactor contents became sufficiently liquid to turn on the mechanical stirrer. The temperature of the reactants was raised slowly to 191 degrees C. over a period of about 5 hours, whereupon the heater was turned off. About 102 gm. of water were distilled off. After the product cooled, solvent consisting of equal weights of xylene and n-butanol was added to it alone to produce a 90% solids composition. The latter was clear with a Gardner-Holdt viscosity of Y−. The acid number of the solids was 11.5.

The system functionality of this polyester resin formulation was calculated to be 1.688 using the method described hereinbefore. The various values obtained in the course of calculating the system functionality are set forth in Table 1. The excess hydroxyl factor (F) was calculated to be 0.756.

Table 1

| Component | Moles | f | Equiv. | feff | $f_{Teff}$ |
|---|---|---|---|---|---|
| THPA | 2.91 | 2 | 5.82 | 2 | 5.82 |
| MA | 2.51 | 2 | 5.02 | 2 | 5.02 |
| TOFA | 1.81 | 1 | 1.81 | 1 | 1.81 |
| NPG | 6.56 | 2 | 13.12 | 1.51 | 9.90 |
| TMP | 1.21 | 3 | 3.63 | 2.27 | 2.74 |

EXAMPLE 3

This Example illustrates the method of making and curing a pigmented coating formulation incorporating a polyester resin of this invention.

To a suitable container, there were added: 370 gm. of a 90% solids solution of the polyester resin made as described in Example 2; and 464 gm. of Dupont R-960 titanium dioxide. The resulting mixture was ground at a reduced temperature (approximately 10 degrees C.) for about 30 minutes until a particle size of 7+ (Hegman) was obtained.

To the foregoing ground mixture, there were added: an additional 30 gm. of the Example 2 polyester resin solution (90% solids); 103 gm. of hexamethoxymethyl melamine resin (HMMM); 21 gm. of butoxymethyl melamine (60% solids); 21 gm. of n-butanol; 3.7 gm. of a 50% solids IPA solution of acid catalyst consisting of 67% of 105% phosphoric acid and 33% 96% of sulfuric acid; 10 gm. of dinonyl naphthalene disulfonic acid catalyst (DNNDSA) (55% solids); and 1.9 gm. of a wax dispersion (15% solids). The foregoing components were added to the ground mixture at the aforementioned reduced temperature. Mixing was continued for about 15 minutes.

Based upon total charge, this coating formulation was 90.02% by weight solids and weighed 12.54 lb/gal.

This material was coated directly on aluminum and was cured for 1 minute at 288 degrees C. (550 degrees F). The cured paint film exhibited a gloss of 98-100, good stain resistance, and excellent resistance to methyl ethyl ketone (MEK) in an MEK rub test.

EXAMPLE 4

A number of polyester resins (A-E) were prepared by the method described in Example 2. In E, the ester was made by transesterification of soybean oil. The components and amounts thereof are shown in Table 2. In each case, the ester compound mixture is shown as its component parts, i.e., as triol(s) and fatty acid. The catalyst used was the same as described in Example 1. Solids acid number and the viscosity (Gardner-Holdt) of a 90% solids solution of the polyester resin are also given in Table 2.

Table 2

| | Polyester Resin | | | | |
|---|---|---|---|---|---|
| Component | A | B | C | D | E |
| THPA | 37.6 | | 22.5 | 22.4 | 28.8 |
| PA | | 23.4 | | | |
| MA | | 10.2 | 9.99 | 9.94 | 8.81 |
| TOFA | 27.6 | 24.4 | | 27.7 | |
| INA | | | 23.9 | | |
| SFA | | | | | 20.3 |
| NPG | 25.8 | 21.2 | | 30.9 | 37.1 |
| 1,6 HD | | 12.6 | | | |
| DEG | | | 29.8 | | |
| TMP | 8.7 | 7.68 | 13.6 | 8.73 | 3.25 |
| Glycerine | | | | | 2.25 |
| Catalyst | 0.3 | 0.47 | 0.29 | 0.29 | 0.3 |
| Fsys | 1.68 | 1.70 | 1.66 | 1.68 | 1.63 |
| Acid no. | 15.0 | 15.8 | 11.0 | 11.5 | 10.2 |
| Viscosity | Y-Z | Z-1 | U | V+ | Z-1 |

EXAMPLE 5

Polyester resin D from Example 4 was utilized as a 95% solids solution to make a pigmented paint by the method set forth in Example 3. Components and amounts thereof used in this paint were: resin solution D (95% solids)—350 gm.; titanium dioxide—534 gm.; isopropyl alcohol (IPA)—19.5 gm.; and Cymel 303 (HMMM—100% solids)—103 gm.; butoxymethyl melamine (BMMM)—41 gm.; resin D (95% solids)—28 gm.; phosphoric/sulfuric acid catalyst (see Example 3) as 50% solids in IPA—3.7 gm.; DNNDSA (55% solids)—10.0 gm.; wax dispersion (15% solids)—1.8 gm.; IPA—31 gm.; and xylene—10 gm.

The foregoing paint formulation contained 52% pigment (as percent of total solids) and 90.84% solids. It was coated on primed venetian blind strips using a #10 bar draw down and was cured for 1 minute at 204 degrees C. (400 degrees F.). The cured paint had a pencil hardness greater than 2H and passed a 2T bend test. After 100 double rubs using MEK, it was unaffected.

Some of the same paint formulation was coated on unprimed aluminum sheet approximating a venetian blind strip and cured for only 45 seconds at 204 degrees C. The resulting cured coating exhibited very good MEK resistance and a pencil hardness of H. It also passed a 2T bend test.

EXAMPLE 6

This example illustrates the higher amounts of pigment includable in the herein-described coating compositions.

A paint was made as described in Example 3 using the following constituents and amounts: resin solution D (95% solids) from Example 4—280 gm.; titanium dioxide—499.3 gm.; xylene—30.5 gm.; and Resimene 745 (HMMM—100% solids)—49.9 gm.; BMM (60% solids)—20.8 gm.; phosphoric/sulfuric acid catalyst (see Example 3)—3.0 gm.; DNNDSA (55% solids)—4.05 gm.; wax dispersion (15% solids)—1.7 gm.; IPA—13.5 gm.; and xylene—12.2 gm.

Part of the ground and mixed composition was coated on an aluminum strip using a #10 bar draw down and was cured at 149 degrees C. (300 degrees F.) for 5 minutes.

The cured coating (91% solids) had a pencil hardness of F, permitted no tape-off at the crown of a 0 degree T bend, and successfully resisted a 200 double rub MEK test. The coating exhibited very high gloss showing that is provided excellent hiding in spite of the high pigment concentration (60% of solids).

Some of the paint formulation was also coated on this aluminum strip, but was cured at 232 degrees C. (450 degrees F.) for only one minute.

This cured coating had a pencil hardness of H+, permitted no tape-off of material at the crown of a 0 degree T bend, and passed a 200 MEK double rub test. It also exhibited very high gloss.

SUMMARY

Hereinbefore, there has been described a polyester resin which is suitable for combination with a cross-linking agent, such as an aminoplast resin, and a solvent therefor to produce a heat-curable, film-forming composition which may comprise 90% by weight (and higher) solids. Additionally, pigment may be included in the flim-forming composition in amounts up to at least 60% by weight of the weight of solids with good results.

The polyester resin may be made from a reaction mixture comprising an aliphatic diol, a cyclic dicarboxylic acid, and a monocarboxylic acid, but is preferably the condensation reaction product obtained by heating a reaction mixture comprising an aliphatic diol, a cyclic dicarboxylic acid and a mixture of hydroxyl-bearing mono- and di-esters having an average hydroxyl functionality between about 1.4 and about 1.8. In both embodiments, the reaction mixture has a system functionality between about 1.6 and about 1.8.

Numerous specific compounds have been identified as useful members of each of the reactants. Those skilled in the art know that, for each reactant, they can use combinations of compounds of that reactant class. They also know that various equivalent reactants are available. For example, advantage can be taken of the fact that epoxides are converted to diols in acid media. Thus, rather than start with diols, epoxides, such as heptane epoxide, may be initially included in the reaction mixture for conversion therein to the equivalent diol.

I claim:

1. An hydroxyl-bearing, polyester resin suitable for combination with a cross-linking agent to form a heat-curable, film-forming composition comprising at least about 90% by weight solids, said polyester resin being the condensation reaction product obtained by the heating of
   (a) an aliphatic diol having about 4 to about 9 carbon atoms with
   (b) a cyclic dicarboxylic acid or anhydride thereof and
   (c) a mono carboxylic fatty acid having between about 8 and about 20 carbon atoms
in a reaction mixture in which said (a) is present in an amount sufficient to provide hydroxyl groups in excess of the carboxyl groups from said acids and which has a system functionality between about 1.6 and about 1.8, the molar ratio of said (b) to said (c) being between about 4:1 and about 1.5:1.

2. The polyester resin of claim 1 wherein said monocarboxylic fatty acid is present as a mixture of hydroxyl-bearing mono- and di-esters having an average hydroxyl functionality between about 1.4 and about 1.8, said mixture being obtained by the reaction of (d) an aliphatic triol with a member selected from the group consisting of oils and said monocarboxylic fatty acids, the molar ratio of said (a) to the total triol from said (d) and said oils being between about 2.5:1 and about 7.5:1, and said (a), said (d), and the triol from said oils combined providing said excess of said hydroxyl groups.

3. The polyester resin of claim 2 wherein said oil is soybean, sunflower, safflower, olive, walnut or palm oil or mixtures thereof.

4. The polyester resin of claim 3 wherein said triol has 3 to about 7 carbon atoms.

5. The polyester resin of claim 2 wherein said reaction mixture is heated at a temperature at which there is substantially no ester interchange between said diol and said triol.

6. The polyester resin of claim 2 in which said reaction mixture further comprises (e) an unsaturated aliphatic dicarboxylic acid or anhydride thereof in an amount which improves adhesion of said film-forming composition to a substrate up to about 14% by weight of the total weight of reactants charged.

7. The polyester resin of claim 6 wherein said (e) has about 4 to about 10 carbon atoms.

8. The polyester resin of claim 6 wherein said (e) is present in an amount between about 10% and about 14% by weight of the weight of reactants charged.

9. The polyester resin of claim 2 wherein said heating of said reaction mixture is continued until a solids acid number thereon below about 20 is obtained.

10. A polyester resin solution comprising the polyester resin of claim 2 and a solvent therefor, said solution having a Gardner-Holdt viscosity not greater than about Z2 at about 90% by weight solids.

11. A heat-curable, film-forming composition comprising the polyester resin of claim 2, a cross-linking agent reactive with hydroxyl groups and having 2-6 reactive sites per molecule, and a solvent therefor, said cross-linking agent being present in an amount sufficient to react with substantially all of said hydroxyl groups of said polyester resin.

12. The cured film obtained by heating said composition of claim 11 to a temperature sufficient to copolymerize said polyester resin and said cross-linking agent.

13. The polyester resin of claim 1 wherein said reaction mixture further comprises (e) an unsaturated aliphatic dicarboxylic acid or anhydride thereof in an amount which improves adhesion of said film-forming composition to a substrate up to about 14% by weight of the total weight of reactants charged, said (a) providing hydroxyl groups in excess of said (b), (c) and (e) combined.

14. The polyester resin of claim 13 wherein said (e) has about 4 to about 10 carbon atoms.

15. The polyester resin of claim 13 wherein said (e) is present in an amount between about 10% and about 14% by wt. of the weight of reactants charged.

16. The polyester resin of claim 1 wherein said heating is continued until a reaction mixture solids acid number below about 20 is obtained.

17. A polyester resin solution comprising the polyester resin of claim 1 and a solvent therefor, said solution having a Gardner-Holdt viscosity not greater than about Z2 at about 90% by weight solids.

18. A heat-curable, film-forming composition comprising the polyester resin of claim 1, a cross-linking agent reactive with hydroxyl groups and having 2-6 reactive sites per molecule, and a solvent therefor, said cross-linking agent being present in an amount sufficient to react with substantially all of said hydroxyl groups of said polyester resin.

19. The cured film obtained by heating the composition of claim 18 to copolymerize said polyester resin and said cross-linking agent.

20. A polyester resin having an average of about, but less than, 2 pendant hydroxyl groups per molecule, and being suitable for combination with a cross-linking agent to form a heat-curable, film-forming composition comprising at least about 90% by weight solids, said polyester resin being the condensation reaction product obtained by heating (a) an aliphatic diol having about 4 to about 9 carbon atoms with (b) a cyclic dicarboxylic acid or anhydride thereof and (c) a monocarboxylic fatty acid having between about 8 and about 20 carbon atoms in a reaction mixture for a time sufficient to obtain a reaction mixture solids acid number below about 20, said (a) being present in said reaction mixture in an amount sufficient to provide hydroxyl groups in excess of the carboxyl groups from said acids, said reaction mixture having a system functionality between about 1.6 and about 1.8, the molar ratio of said (b) to said (c) being between about 4:1 and about 1.5:1.

21. The polyester resin of claim 20 wherein said monocarboxylic fatty acid is present as a mixture of hydroxyl-bearing mono- and di-esters having an average hydroxyl functionality between about 1.4 and about 1.8, said mixture being obtained by the reaction of (d) an aliphatic triol with a member selected from the group consisting of oils and said monocarboxylic fatty acids, the molar ratio of said (a) to the total triol from said (d) and said oils being between about 2.5:1 and about 7.5:1, and said (a), said (d) and the triol from said oils combined providing said excess of said hydroxyl groups.

22. The polyester resin of claim 21 wherein said reaction mixture is heated at a temperature at which there is substantially no ester interchange between said diol and said triol.

23. The polyester resin of claim 21 in which said reaction mixture further comprises (e) an unsaturated aliphatic dicarboxylic acid or anhydride thereof having from about 4 to about 10 carbon atoms per molecule, said (e) being present in an amount which provides improved adhesion of said film-forming composition to a substrate up to about 14% by weight of the total weight of reactants charged.

24. A polyester resin solution comprising the polyester resin of claim 21 and a solvent therefor, said solution having a Gardner-Holdt viscosity not greater than about Z2 at about 90% by weight solids.

25. A heat-curable, film-forming composition comprising the polyester resin of claim 21, an aminoplast resin reactive with hydroxyl groups and having 2-6 reactive sites per molecule and a solvent therefor, said resin being present in an amount sufficient to react with substantially all of said hydroxyl groups of said polyester resin.

26. The composition of claim 25 wherein said aminoplast resin is a material selected from the group consisting of melamines and ureas having pendant alkoxy and alkylol substituents available for reaction with said hydroxyl groups of said polyester resin, said alkoxy and said alkylol substituents having from 1-4 carbon atoms.

27. The cured film obtained by heating the composition of claim 25 to copolymerize said polyester resin and said aminoplast resin.

28. The polyester resin of claim 20 wherein said reaction mixture further comprises (e) an unsaturated aliphatic dicarboxylic acid or anhydride thereof having from about 4 to about 10 carbon atoms per molecule, said (e) being present in an amount which improves adhesion of said film-forming composition to a substrate up to about 14% by weight of the total weight of reactants charged.

29. A polyester resin solution comprising the polyester resin of claim 20 and a solvent therefor, said solution having a Gardner-Holdt viscosity not greater than about Z2 at about 90% by weight solids.

30. A heat-curable, film-forming composition comprising the polyester resin of claim 20, an aminoplast resin reactive with hydroxyl groups and having 2-6 reactive sites per molecule, and a solvent therefor, said aminoplast resin being present in an amount sufficient to react with substantially all of said hydroxyl groups of said polyester resin.

31. The composition of claim 30 wherein said aminoplast resin is a material selected from the group consisting of melamines and ureas having pendant alkoxy and alkylol substituents available for reaction with said hydroxyl groups of said polyester resin, said alkoxy and said alkylol substituents having from 1-4 carbon atoms.

32. The cured film obtained by heating the composition of claim 30 to copolymerize said polyester resin and said aminoplast resin.

33. An hydroxyl-bearing, polyester resin having an average of about, but less than, 2 hydroxyl groups per molecule and an average molecular weight of about 900 to about 1100, said polyester resin being capable of forming, in combination with an aminoplast resin, a heat-curable, film-forming composition comprising at least about 90% by weight solids and, in combination with a solvent therefor, a solution having a Gardner- Holdt viscosity not greater than about Z2 at about 90% by weight solids, said polyester resin being the condensation reaction product obtained by heating

- (a) an aliphatic diol which is a material selected from the group consisting of: neopentyl glycol; 1,6 hexane diol; diethylene glycol; dipropylene glycol; 1,5 pentane diol; 2 ethyl-1,3 hexane diol; 1,4 and 1,3 butane diol; cyclohexane dimethanol; and trimethyl-1,6 hexane diol, and mixtures thereof with
- (b) a cyclic dicarboxylic acid or anhydride thereof, said (b) being a material selected from the group consisting of: methyl tetrahydrophthalic acid; hexahydrophthalic acid; tetrahydrophthalic acid; phthalic acid; cyclohexane dicarboxylic acid; and methyl hexahydrophthalic acid, and mixtures thereof, and
- (c) a monocarboxylic fatty acid which is a material selected from the group consisting of pelargonic, linoleic, oleic, palmitic, stearic, highly refined tall oil acids, mixtures of the fatty acids from soybean oil, lauric acid, myristic acid, 2-ethyl hexoic acid, isonononoic acids, and mixtures thereof, in a reaction mixture comprising said (a), (b), and (c) for a time sufficient to obtain a reaction mixture solids acid number below about 20, said (a) being present in an amount sufficient to provide hydroxyl groups in excess of the carboxyl groups from said acids to provide said reaction mixture with a system functionality between about 1.6 and about 1.8, the molar ratio of said (b) to said (c) being between about 4:1 and about 1.5:1.

34. The polyester resin of claim 33 wherein said monocarboxylic acid is present as a mixture of hydroxyl-bearing mono- and di-esters obtained by the reaction of (d), an aliphatic triol having 3 to about 7 carbon atoms with a material selected from the group consisting of oils and said monocarboxylic fatty acids, said mixture of said mono- and di-esters having an average hydroxyl functionality between about 1.4 and about 1.8, the molar ratio of said (a) to the total triol from said (d) and said oils being between about 2.5:1 and about 7.5:1, said (a), said (d), and the triol from said oils combined providing said excess of said hydroxyl groups.

35. The polyester resin of claim 34 wherein said oil is soybean, sunflower, safflower, olive, walnut or palm oil, or mixtures thereof.

36. The polyester resin of claim 35 wherein said triol is trimethylol ethane, trimethylol propane, trimethylol butane, hexane triol or glycerine.

37. The polyester resin of claim 36 wherein said reaction mixture further comprises (e) an unsaturated aliphatic dicarboxylic acid, or anhydride thereof, which is a material selected from the group consisting of maleic, fumaric, itaconic and citraconic acid, and mixtures thereof, said (e) being present in an amount between about 10% and about 14% by wt. of the weight of reactants charged.

38. A heat-curable, film-forming composition comprising the polyester resin of claim 34, an aminoplast resin which is a material selected from the group consisting of melamines and ureas having at least two pendant alkoxy and alkylol substituents per molecule having from 1 to 4 carbon atoms, and a solvent therefor, said aminoplast resin being present in an amount sufficient to react with substantially all of said hydroxyl groups of said polyester resin.

39. A cured film obtained by the heating of said composition of claim 38 to a temperature sufficient to copolymerize said polyester and aminoplast resins.

40. The polyester resin of claim 33 wherein said reaction mixture further comprises (e) an unsaturated aliphatic dicarboxylic acid, or anhydride thereof, which is a material selected from the group consisting of maleic, fumaric, itaconic and citraconic acid, and mixtures thereof, said (e) being present in an amount between about 10% and about 14% by wt. of the weight of reactants charged.

41. A heat-curable, film-forming composition comprising the polyester resin of claim 33, an aminoplast resin which is a material selected from the group consisting of melamines and ureas having at least two pendant alkoxy and alkylol substituents per molecule having 1 to 4 carbon atoms, and a solvent therefor, said aminoplast resin being present in an amount sufficient to react with substantially all of said hydroxyl groups of said polyester resin.

42. A cured film obtained by the heating of said composition of claim 40 to copolymerize said polyester and aminoplast resins.

* * * * *